United States Patent
Kim (10) Patent No.: US 12,545,243 B2
(45) Date of Patent: Feb. 10, 2026

(54) APPARATUS FOR DRIVER ASSISTANCE AND METHOD FOR DRIVER ASSISTANCE

(71) Applicant: HL KLEMOVE CORP., Incheon (KR)

(72) Inventor: Nayoung Kim, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 262 days.

(21) Appl. No.: 18/222,426

(22) Filed: Jul. 15, 2023

(65) Prior Publication Data
US 2024/0051525 A1 Feb. 15, 2024

(30) Foreign Application Priority Data
Aug. 10, 2022 (KR) .......................... 10-2022-0100033

(51) Int. Cl.
*B60W 30/00* (2006.01)
*B60W 30/09* (2012.01)

(52) U.S. Cl.
CPC ....... *B60W 30/09* (2013.01); *B60W 2420/403* (2013.01); *B60W 2420/408* (2024.01);
(Continued)

(58) Field of Classification Search
CPC .......... B60W 30/09; B60W 2420/403; B60W 2420/408; B60W 2530/201; B60W 2552/53; B60W 2554/4041; B60W 2554/802; B60W 2554/804; B60W 2720/10; B60W 30/0956; B60W 30/095;
(Continued)

(56) References Cited

U.S. PATENT DOCUMENTS

2017/0210382 A1* 7/2017 Nishimura ............ B60W 30/09
2017/0236422 A1* 8/2017 Naka ...................... G08G 1/165
(Continued)

FOREIGN PATENT DOCUMENTS

EP 3889721 A1 * 12/2019 ............... G05D 1/02
JP 2016-224825 12/2016
(Continued)

*Primary Examiner* — Ramya P Burgess
*Assistant Examiner* — Brittany Renee Peko
(74) *Attorney, Agent, or Firm* — WOMBLE BOND DICKINSON (US) LLP (57) ABSTRACT

Disclosed herein is an apparatus. an apparatus for driver assistance includes a sensor including at least one of a camera or a radar, the camera installed on a vehicle, having a field of view outside the vehicle, and configured to provide image data, and the radar installed on the vehicle, having a detection area outside the vehicle, and configured to provide radar data, and at least one processor configured to control the vehicle based on processing at least one of the image data or the radar data. The at least one processor may be configured to avoid a front object of the vehicle based on processing the at least one data; provide an avoidance path based on a position of the front object in response to a distance between the front object and a lane line marker that is greater than or equal to a first reference distance, provide an avoidance path based on a position of the lane line marker in response to the distance between the front object and the lane line marker that is less than the first reference distance, and control the vehicle to travel along the avoidance path.

20 Claims, 7 Drawing Sheets

(52) U.S. Cl.
CPC ... *B60W 2530/201* (2020.02); *B60W 2552/53* (2020.02); *B60W 2554/4041* (2020.02); *B60W 2554/802* (2020.02); *B60W 2554/804* (2020.02); *B60W 2720/10* (2013.01)

(58) Field of Classification Search
CPC ....... B60W 40/105; B60W 2050/0005; B60W 2520/10; B60W 2554/4042; B60R 11/04; G01S 13/931; H04N 23/57
See application file for complete search history.

(56) References Cited

U.S. PATENT DOCUMENTS

| | | | |
|---|---|---|---|
| 2022/0073064 A1* | 3/2022 | Park | B60W 30/0956 |
| 2022/0234615 A1* | 7/2022 | Nishino | B60W 60/0011 |
| 2023/0054263 A1* | 2/2023 | Lin | B60W 30/09 |
| 2024/0043009 A1* | 2/2024 | Igarashi | B60W 30/18163 |

FOREIGN PATENT DOCUMENTS

| | | | |
|---|---|---|---|
| JP | 2021-020497 | 2/2021 | |
| JP | 2023063985 A * | 5/2023 | ............ B60W 30/09 |

\* cited by examiner

APPARATUS FOR DRIVER ASSISTANCE AND METHOD FOR DRIVER ASSISTANCE

CROSS-REFERENCE TO RELATED APPLICATION

This application claims the benefit of Korean Patent Application No. 10-2022-0100033, filed on Aug. 10, 2022 in the Korean Intellectual Property Office, the disclosure of which is incorporated herein by reference.

BACKGROUND

1. Field

Embodiments of the present disclosure relate to an apparatus for driver assistance and a method for driver assistance capable of avoiding an object in a lane.

2. Description of the Related Art

Vehicles are the most common means of transportation in modern society, and the number of people using the vehicles is increasing. As vehicle technology advances, there are advantages to traveling long distances and making life easier, but in densely populated areas such as Korea, there is often a problem in that road traffic conditions worsen and traffic congestion becomes severe.

In recent years, research has been actively conducted on vehicles equipped with advanced driver assistance systems (ADASs), which actively provide information on a vehicle status, a driver status, and/or a nearby environment to reduce a driver's burden and increase convenience.

An example of the advanced driver assistance system mounted on vehicle includes a lane departure warning (LDW) system, a lane keeping assist (LKA) system, a high beam assist (HBA) system, an autonomous emergency braking (AEB) system, a traffic sign recognition (TSR) system, an adaptive cruise control (ACC) system, or a blind spot detection (BSD) system.

The driver assistance system may collect information on the nearby environment and process the collected information. In addition, the driver assistance system may recognize an object and design a path for the vehicle to travel based on results of processing the collected information.

With the recent increase of two-wheeled transportation such as cycles and motorized vehicles on the road, there is a growing need to avoid collisions with the two-wheeled transportation without interfering with traffic flow.

SUMMARY

Therefore, it is an aspect of the present disclosure to provide a driver assistance apparatus and a driver assistance method capable of avoiding a collision with a two-wheeled transportation, a vehicle, a pedestrian, or the like, without interfering with traffic flow.

Additional aspects of the disclosure will be set forth in part in the description which follows and, in part, will be obvious from the description, or may be learned by practice of the disclosure.

In accordance with one aspect of the present disclosure, an apparatus for driver assistance includes a sensor including at least one of a camera or a radar, the camera installed on a vehicle, having a field of view outside the vehicle, and configured to provide image data, and the radar installed on the vehicle, having a detection area outside the vehicle, and configured to provide radar data, and at least one processor configured to control the vehicle based on processing at least one of the image data or the radar data. The at least one processor may be configured to avoid a front object of the vehicle based on processing the at least one data; provide an avoidance path based on a position of the front object in response to a distance between the front object and a lane line marker that is greater than or equal to a first reference distance, provide an avoidance path based on a position of the lane line marker in response to the distance between the front object and the lane line marker that is less than the first reference distance, and control the vehicle to travel along the avoidance path.

The at least one processor may provide an avoidance path maintaining a distance between the vehicle and the front object as a second reference distance in response to the distance between the front object and the lane line marker being greater than or equal to the first reference distance.

The second reference distance may be based on a difference between the first reference distance and a width of the vehicle.

The at least one processor may provide an avoidance path maintaining a distance between the vehicle and the lane line marker as a third reference distance in response to the distance between the front object and the lane line marker being less than the first reference distance.

The third reference distance may be less than a difference between the first reference distance and a width of the vehicle.

The at least one processor may avoid the front object of the vehicle based on whether the front object overlaps the vehicle.

The at least one processor may avoid the front object of the vehicle based on whether the distance between the front object and the lane line marker is greater than or equal to a width of the vehicle.

In accordance with another aspect of the present disclosure, a method for driver assistance include processing at least one of image data provided from a camera having a field of view outside a vehicle or radar data provided from a radar having a detection area outside the vehicle, avoiding a front object of the vehicle based on processing the at least one data. The avoiding of the front object of the vehicle includes providing an avoidance path based on a position of the front object in response to a distance between the front object and a lane line marker that is greater than or equal to a first reference distance, providing an avoidance path based on a position of the lane line marker in response to the distance between the front object and the lane line marker that is less than the first reference distance, and controlling the vehicle to travel along the avoidance path.

The avoiding of the front object of the vehicle may further include providing an avoidance path maintaining a distance between the vehicle and the front object as a second reference distance in response to the distance between the front object and the lane line marker being greater than or equal to the first reference distance.

The second reference distance may be based on a difference between the first reference distance and a width of the vehicle.

The avoiding of the front object of the vehicle may further include providing an avoidance path maintaining a distance between the vehicle and the lane line marker as a third reference distance in response to the distance between the front object and the lane line marker being less than the first reference distance.

The third reference distance may be less than a difference between the first reference distance and a width of the vehicle.

The avoiding of the front object of the vehicle may include avoiding the front object of the vehicle based on whether the front object overlaps the vehicle.

The avoiding of the front object of the vehicle may include avoiding the front object of the vehicle based on whether the distance between the front object and the lane line marker is greater than or equal to a width of the vehicle.

The avoiding of the front object of the vehicle may include reducing a speed of the vehicle to a speed of the front object upon the distance between the front object and the lane line marker being less than a width of the vehicle.

In accordance with still another aspect of the present disclosure, an apparatus for driver assistance includes a camera installed on a vehicle, having a field of view outside the vehicle, and configured to provide image data, a radar installed on the vehicle, having a detection area outside the vehicle, and configured to provide radar data, a first processor configured to provide first information on an object around the vehicle based on processing the image data, a second processor configured to provide second information of the object around the vehicle based on processing the radar data, and a third processor configured to avoid a front object of the vehicle based on at least one of the first information or the second information. At least one processor of the first processor, the second processor or the third processor may provide an avoidance path based on a position of the front object in response to a distance between the front object and a lane line marker that is greater than or equal to a first reference distance, and provide the avoidance path based on a position of the lane line marker in response to the distance between the front object and the lane line marker that is less than the first reference distance. The third processor controls the vehicle to travel along the avoidance path.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 1:
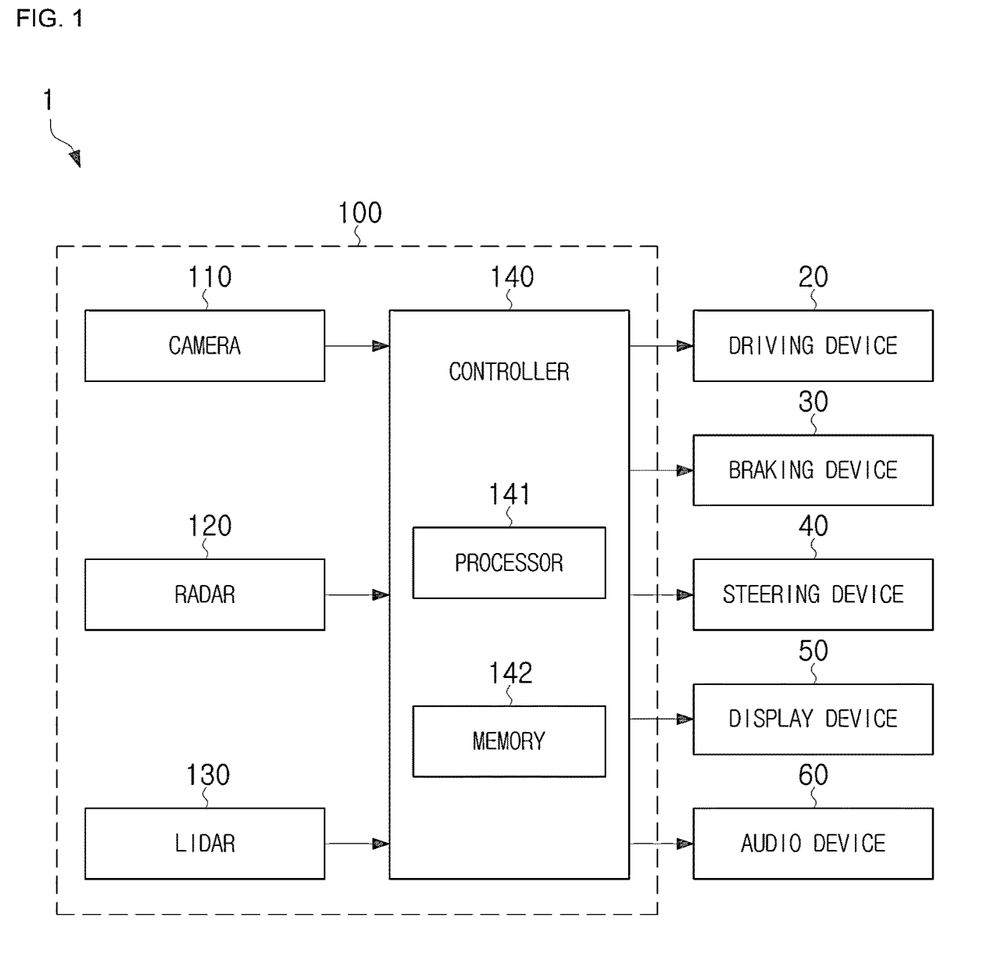
FIG. 1 illustrates a configuration of a vehicle and a driver assistance apparatus according to one embodiment.
Figure 2:
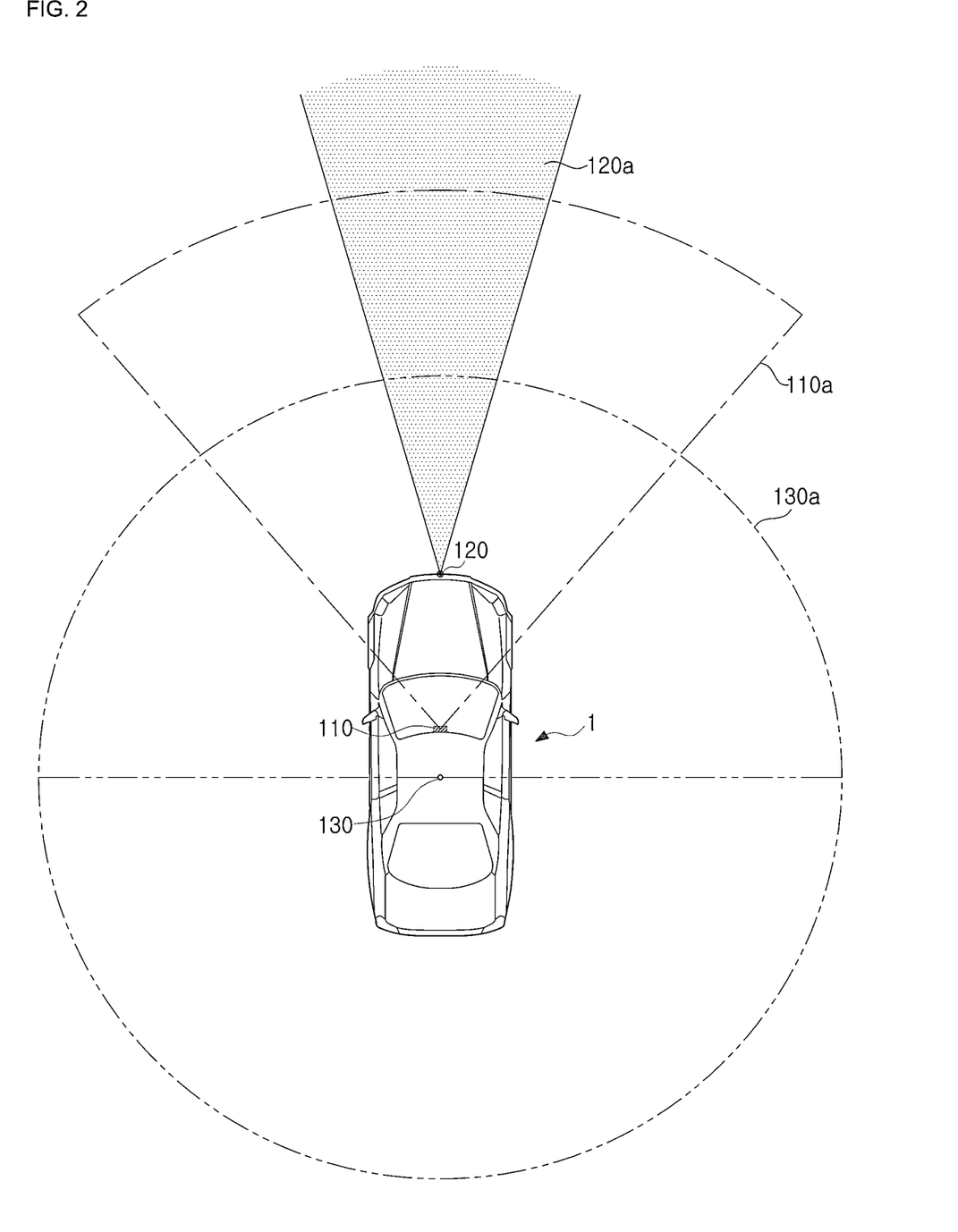
FIG. 2 illustrates a field of view of a camera and a radar included in the driver assistance apparatus according to one embodiment.

FIG. 1 illustrates a configuration of a vehicle according to one embodiment. FIG. 2 illustrates a field of view of a camera and a radar included in a driver assistance apparatus according to one embodiment.

As illustrated in FIG. 1, a vehicle 1 may include a driving device 20, a braking device 30, a steering device 40, and/or a driver assistance apparatus 100. The devices may communicate with each other through a vehicle communication network (NT). For example, the electrical devices 20, 30, 40, and 100 included in the vehicle 1 may transmit and receive data via Ethernet, media oriented systems transport (MOST), Flexray, controller area network (CAN), local interconnect network (LIN), and the like.

The driving device 20 moves the vehicle 1 and may include, for example, an engine, an engine management system (EMS), a transmission, and a transmission control unit (TCU). The engine generates power for the vehicle 1 to travel, and the engine management system may control the engine in response to a driver's intent to accelerate via an accelerator pedal or a request from the driver assistance apparatus 100. The transmission decelerates and transmits power generated by the engine to wheels, and the transmission control unit may control the transmission in response to a shift command from the driver via a shift lever and/or a request from the driver assistance apparatus 100.

The braking device 30 stops the vehicle 1 and may include, for example, a brake caliper and a brake control module (EBCM). The brake caliper may decelerate the vehicle 1 or stop the vehicle 1 using friction with a brake disc, and an electronic brake control module may control the brake caliper in response to a driver's intent to brake via a brake pedal and/or a request from the driver assistance apparatus 100. For example, the electronic brake control module may receive a deceleration request from the driver assistance apparatus 100 that includes a deceleration rate, and may electrically or hydraulically control the brake calipers to decelerate the vehicle 1 depending on the requested deceleration rate.

The steering device 40 may include an electronic power steering control module (EPS). The steering device 40 may change a direction of travel of the vehicle 1, and the electric power steering control module may assist an operation of the steering device 40 in response to a driver's intent to steer via a steering wheel to facilitate the driver's operation of the steering wheel. Additionally, the electronic power steering control module may control the steering device in response to a request from the driver assistance apparatus 100. For example, the electronic power steering control module may receive a steering request including a steering torque from the driver assistance apparatus 100 and control the steering device to steer the vehicle 1 depending on the requested steering torque.

The driver assistance apparatus 100 may communicate with the driving device 20, the braking device 30, the steering device 40, a display device 50, and an audio device 60 through a vehicle communication network.

The driver assistance apparatus 100 may provide various functions for safety to the driver. For example, the driver assistance apparatus 100 may include a lane departure warning (LDW) system, a lane keeping assist (LKA) system, a high beam assist (HBA) system, an autonomous emergency braking (AEB) system, a traffic sign recognition (TSR) system, an adaptive cruise control (ACC) system, a blind spot detection (BSD) system, or the like.

The driver assistance apparatus 100 may include a camera 110, a radar 120, a lidar 130, and a controller 140. The driver assistance apparatus 100 is not limited to that illustrated in FIG. 1. For example, in the driver assistance apparatus 100 illustrated in FIG. 1, at least one detection device of the camera 110, the radar 120, or the lidar 130 may be omitted, or various detection devices that are capable of detecting nearby objects of the vehicle 1 may be added.

The camera 110 may photograph the surroundings of the vehicle 1 and obtain image data of the surroundings of the vehicle 1. For example, the camera 110 may be mounted on a front windshield of the vehicle 1, as illustrated in FIG. 2, and may have a field of view 110*a* facing the front of the vehicle 1.

The camera 110 may include a plurality of lenses and an image sensor. The image sensor may include a plurality of photodiodes that convert light into electrical signals, and the plurality of photodiodes may be disposed in a two-dimensional matrix. The image data may include information on other vehicles, pedestrians, cyclists, or lane markers (markers distinguishing lanes) located around the vehicle 1.

The camera 110 may be electrically connected to the controller 140. For example, the camera 110 may be connected to the controller 140 through the vehicle communication network (NT) or connected to the controller 140 through a hard wire. The camera 110 may transmit image data around the vehicle 1 to the controller 140.

The radar 120 may emit transmission radio waves toward the surroundings of the vehicle 1 and detect nearby objects of the vehicle 1 based on reflected radio waves reflected from the nearby objects. For example, the radar 120 may be mounted on a grille or a bumper of the vehicle 1, as illustrated in FIG. 2, and may have a field of sensing 120*a* facing the front of the vehicle 1.

The radar 120 may include a transmitting antenna (or transmitting antenna array) that emits transmission radio waves toward the surroundings of the vehicle 1, and a receiving antenna (or receiving antenna array) that receives reflected radio waves that are reflected by an object.

The radar 120 may obtain radar data from the transmission radio waves transmitted by the transmitting antenna and the reflected radio waves received by the receiving antenna. The radar data may include position information (e.g., distance information) and/or speed information on objects located in front of the vehicle 1.

The radar 120 may be connected to the controller 140 through, for example, the vehicle communication network (NT) or the hard wire, and may transmit the radar data to the controller 140.

The lidar 130 may emit light (e.g., infrared light) toward the surroundings of the vehicle 1 and detect a nearby object of the vehicle 1 based on reflected light that is reflected from the nearby object. For example, the lidar 130 may be mounted on a roof of the vehicle 1, as illustrated in FIG. 2, and may have a field of view 130*a* directed in all directions around the vehicle 1.

The lidar 130 may include a light source (e.g., a light emitting diode, a light emitting diode array, a laser diode, or a laser diode array) that emits light (e.g., infrared light, etc.), and a light sensor (e.g., a photodiode or a photodiode array) that receives light (e.g., infrared light, etc.). In addition, as needed, the lidar 130 may further include a driving device for rotating the light source and/or the light sensor.

The lidar 130 may emit light through the light source and receive light reflected from the object through the light sensor while the light source and/or the light sensor are rotated, thereby obtaining lidar data. The lidar data may include relative positions of nearby objects of the vehicle 1 (distances of nearby objects and/or directions of nearby objects) and/or relative speeds.

The lidar 130 may be connected to the controller 140 through, for example, the vehicle communication network (NT) or the hard wire, and may transmit the lidar data to the controller 140.

The controller 140 may be electrically connected to the camera 110, the radar 120, and/or the lidar 130. In addition, the controller 140 may be connected to the driving device 20, the braking device 30, the steering device 40, the display device 50, and the audio device 60 through the vehicle communication network (NT).

The controller 140 may process the image data of the camera 110, the radar data of the radar 120, and/or the lidar data of the lidar 130, and provide control signals to the driving device 20, the braking device 30, and/or the steering device 40.

The controller 140 may include a memory 142 and a processor 141.

The memory 142 may store programs and/or data for processing the image data, the radar data, and/or the lidar data. In addition, the memory 142 may store programs and/or data for generating driving/braking/steering signals.

The memory 142 may temporarily store the image data received from the camera 110, the radar data received from the radar 120, and/or the lidar data received from the lidar 130, and may temporarily store processing results of the image data, the radar data, and/or the lidar data of the processor 141.

The memory 142 may include a volatile memory, such as an S-RAM and a D-RAM, as well as a non-volatile memory, such as a flash memory, a read only memory (ROM), and an erasable programmable read only memory (EPROM).

The processor 141 may process the image data of the camera 110, the radar data of the radar 120, and/or the lidar data of the lidar 130. The processor 141 may, based on the processing of the image data of the camera 110, the radar data of the radar 120, and/or the lidar data of the lidar 130, generate a driving signal, a braking signal, and/or a steering signal for controlling the driving device 20, the braking device 30, and/or the steering device 40, respectively.

For example, the processor 141 may include an image processor that processes the image data of the camera 110, a digital signal processor that processes the radar data of the radar 120 and/or the lidar data of the lidar 130, or a micro control unit (MCU) that generates the driving/braking/steering signals.

The processor 141 may perform a sensor fusion to fuse the image data, the radar data, and/or the lidar data to detect the objects around the vehicle 1. Hereafter, data related to the objects (e.g., a lane, a building, a transportation infrastructure, another vehicle, a pedestrian, a cyclist, etc.) provided using the sensor fusion is referred to as "object data".

For example, the processor 141 may identify a relative position (a distance from the vehicle and an angle to a traveling direction) and a classification (e.g., whether the object is another vehicle, a pedestrian, or a cyclist, etc.) of the front objects of the vehicle 1 based on the image data. The processor 141 may identify a relative position and a relative speed of the front objects of the vehicle 1 based on the radar data and the lidar data. In addition, the processor 141 may match objects identified based on the radar data with objects identified based on the image data and objects identified based on the lidar data, and obtain a classification, a relative position, and a relative speed of the objects around the vehicle 1 based on the matching of the objects.

The processor 141 may assess a risk of collision between the vehicle 1 and the nearby objects based on the relative positions and the relative speeds of the nearby objects of the vehicle 1. For example, the processor 141 may calculate a time to collision (TTC) (or a distance to collision (TTD)) between the vehicle 1 and the nearby object based on the position (distance) and the relative speed of the nearby object of the vehicle 1, and assess the risk of collision between the vehicle 1 and the nearby object based on the time to collision. The processor 141 may determine that the risk of collision is higher as the time to collision is smaller.

The processor 141 may select a target object from the nearby objects of the vehicle 1 based on the risk of collision. For example, the processor 141 may select the target object based on the time to collision between the vehicle 1 and the nearby objects.

The processor 141 may generate the driving signal, the braking signal, or the steering signal based on the risk of collision with the target object. For example, the processor 141 may warn the driver of a collision or transmit the braking signal to the braking device 30 based on a comparison of the time of collision (TTC) between the vehicle 1 and the target object with a reference time. In addition, the processor 141 may transmit the steering signal to the steering device 40 to avoid a collision with the target object based on the comparison of the time to collision (TTC) between the vehicle 1 and the target object with the reference time.

A specific operation of the driver assistance apparatus 100 is described in more detail below.

Figure 3:
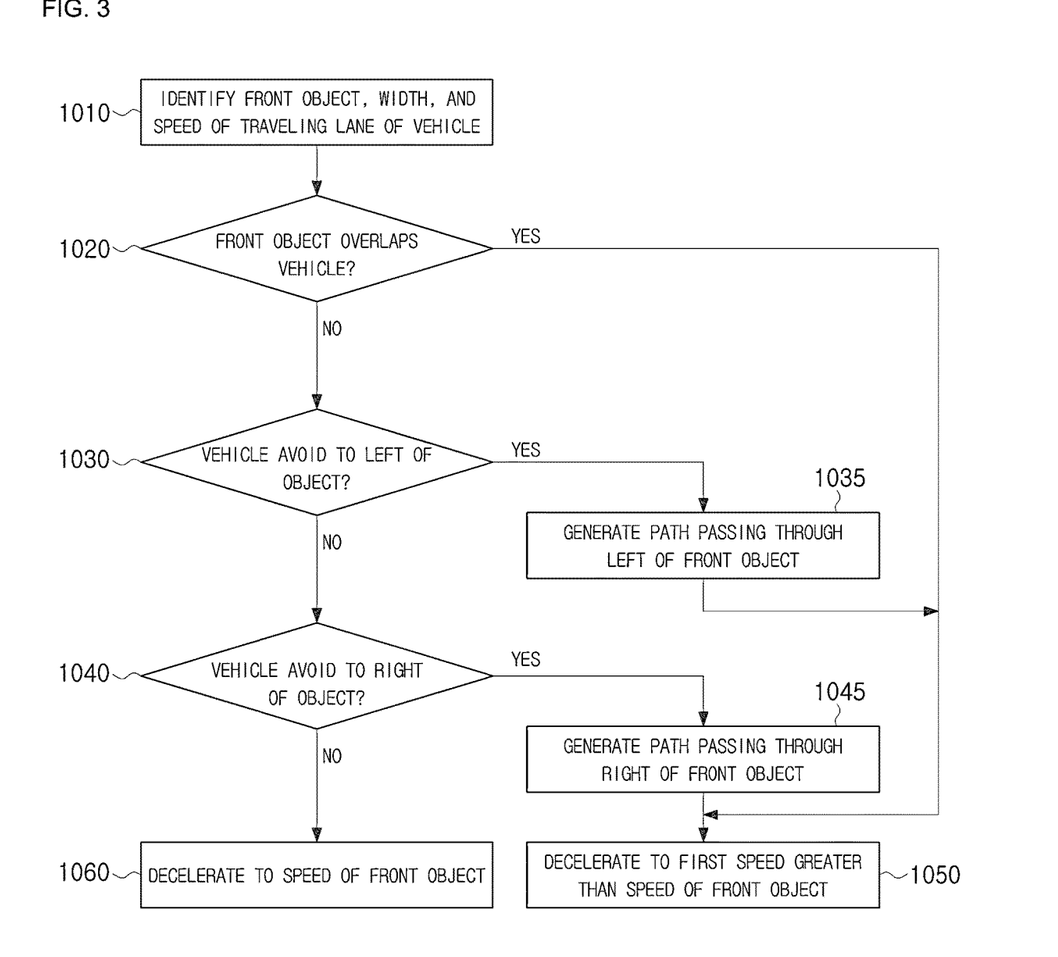
FIG. 3 illustrates a method by which the driver assistance apparatus according to one embodiment controls the vehicle to avoid a front object.
Figure 4:
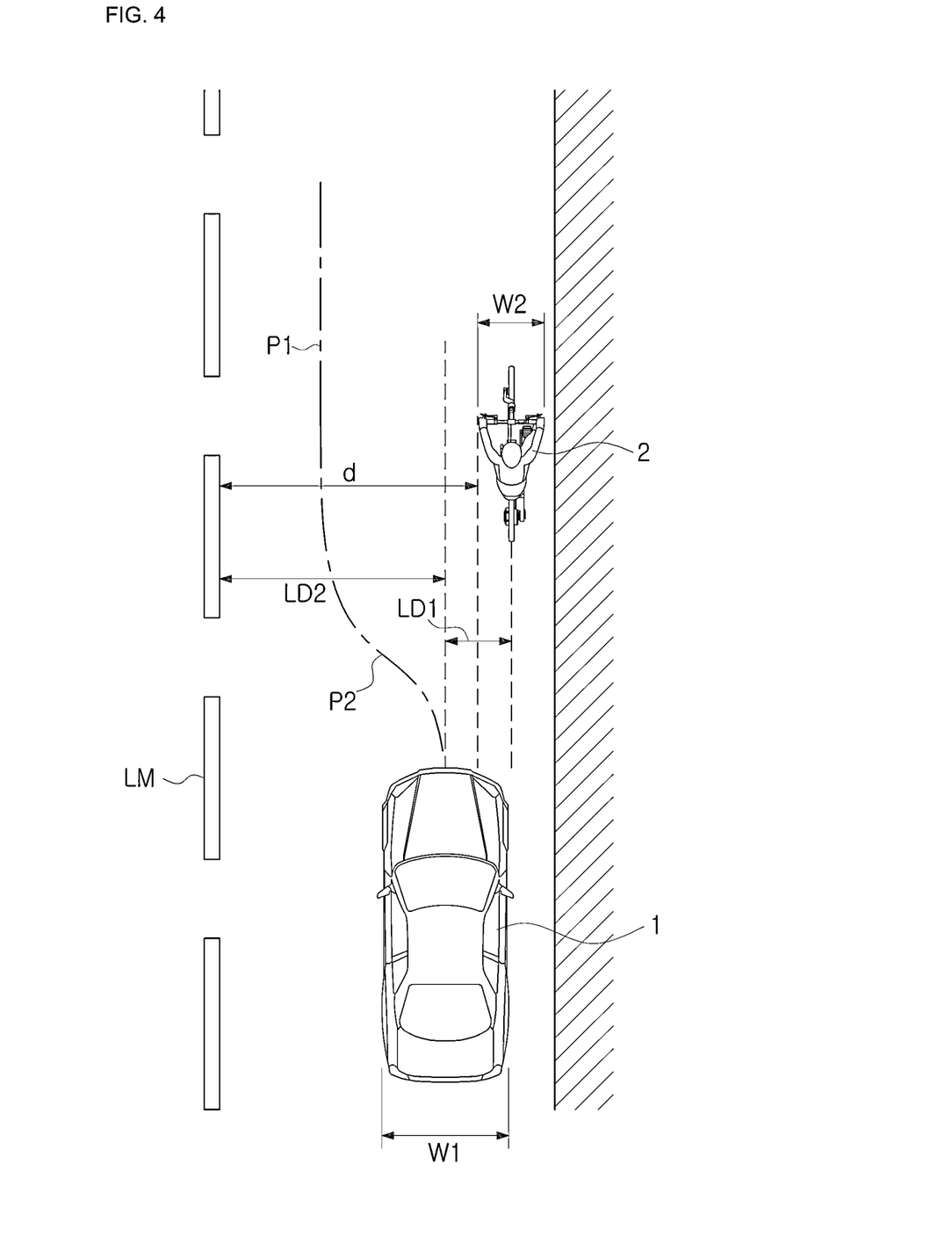
FIG. 4 illustrates one example in which the vehicle avoids the front object in response to a control of the driver assistance apparatus according to one embodiment.

FIG. 3 illustrates a method by which the driver assistance apparatus according to one embodiment controls the vehicle to avoid a front object. FIG. 4 illustrates one example in which the vehicle avoids the front object in response to a control of the driver assistance apparatus according to one embodiment.

With reference to FIGS. 3 and 4, the driver assistance apparatus 100 may identify a front object 2 positioned on a lane in which the vehicle 1 is traveling, a width of the front object 2, and a speed of the front object 2 (1010).

The processor 141 may obtain the image data of the camera 110, the radar data of the radar 120, and/or the lidar data of the lidar 130. The processor 141 may obtain object data of the front object 2 based on the image data, the radar data, and/or the lidar data.

The object data may include a position of the front object 2 (e.g., a relative position and/or an absolute position), a size of the front object 2 (e.g., a width of the object, etc.), and a speed of the front object 2 (e.g., a relative speed and/or an absolute speed). The processor 141 may estimate the size of the front object 2 based on the number of pixels occupied by the front object 2 in the image data and a distance of the front object 2. In particular, the processor 141 may estimate the width of the front object 2.

The driver assistance apparatus 100 may identify whether the front object 2 overlaps the vehicle 1 (1020).

The processor 141 may identify whether the front object 2 overlaps the vehicle 1 based on the relative position of the front object 2 and the width of the front object 2.

For example, as illustrated in FIG. 4, the processor 141 may identify whether the front object 2 overlaps the vehicle 1 based on a lateral distance LD1 between a center of the vehicle 1 and a center of the front object 2, a width W1 of the vehicle 1, and a width W2 of the front object 2. Specifically, the processor 141 may identify that the front object 2 overlaps the vehicle 1 when a difference between the lateral distance LD1 and a half of the width W2 of the front object is less than or equal to a half of the width W1 of the vehicle. In addition, the processor 141 may identify that the front object 2 does not overlap the vehicle 1 when the difference between the lateral distance LD1 and the half of the width W2 of the front object is greater than the half of the width W1 of the vehicle.

When the front object 2 does not overlap the vehicle 1 (NO in 1020), the driver assistance apparatus 100 may control the vehicle 1 to decelerate to a first speed greater than the speed of the front object (1050).

When it is identified that the front object 2 does not overlap the vehicle 1, it may be expected that the vehicle 1 will not collide with the front object 2 during the traveling of the vehicle 1. However, even if the collision with the front object 2 is not expected, it is preferable that a traveling speed of the vehicle 1 is reduced for safe driving.

Therefore, the processor 141 may control the braking device 30 of the vehicle 1 to reduce the traveling speed of the vehicle 1 while the vehicle 1 is traveling along an existing path, based on the identification that the front object 2 does not overlap the vehicle 1. Specifically, the processor 141 may control the braking device 30 of the vehicle 1 to decelerate to the first speed greater than a speed of the front object 2 in order to overtake the front object 2. For example, the processor 141 may control the braking device 30 of the vehicle 1 such that the relative speed of the front object 2 is 30 kph (kilometers per hour) or less.

When the front object 2 overlaps the vehicle 1 (YES in 1020), the driver assistance apparatus 100 may identify whether the vehicle 1 is capable of avoiding the front object 2 to the left of the front object 2 (1030).

The processor 141 may identify that there is a risk of collision between the vehicle 1 and the front object 2 when the front object 2 overlaps the vehicle 1, and may identify whether the vehicle 1 is able to overtake the front object 2 without departing the lane. Specifically, the processor 141 may identify whether the vehicle 1 is able to overtake the front object 2 to the left of the front object 2 without departing the lane.

For example, the processor 141 may identify whether the vehicle 1 is able to overtake the front object 2 to the left of the front object 2 without departing the lane, based on a comparison of a lateral distance d between a left end of the front object 2 and a left lane marker LM with the width W1 of the vehicle 1. The processor 141 may identify a lateral distance LD2 between the center of the vehicle 1 and the lane marker LM based on the image data of the camera 110. The processor 141 may identify the lateral distance d between the left end of the front object and the lane marker LM based on the lateral distance LD2 between the center of the vehicle 1 and the lane marker LM, the lateral distance LD1 between the center of the vehicle 1 and the front object 2, and the width W2 of the front object 2.

The processor 141 may identify that the vehicle 1 may avoid the front object 2 to the left of the front object 2 without departing the lane when the lateral distance d is greater than the width W1 of the vehicle 1. In addition, the processor 141 may identify that the vehicle 1 may not avoid the front object 2 to the left of the front object 2 when the lateral distance d is not greater than the width W1 of the vehicle 1.

As described above, the processor 141 may identify that there is a risk of collision between the vehicle 1 and the front object 2 when the front object 2 overlaps the vehicle 1, but which is not limited thereto.

For example, the processor 141 may identify that there is a risk of collision when a width that the front object 2 overlaps the vehicle 1 is at least approximately 10% of the width W1 of the vehicle, and may identify that the vehicle 1 may avoid the front object 2 without the risk of collision when the width that the front object 2 overlaps the vehicle 1 is less than approximately 10% of the width W1 of the vehicle.

When the vehicle 1 is able to avoid the front object 2 to the left of the front object 2 (YES in 1030), the driver assistance apparatus 100 may generate a path that passes through the left of the front object 2 (1035).

The processor 141 may generate a passing path P1 that passes through the left of the front object 2 when the lateral distance d is greater than the width W1 of the vehicle 1. For example, the processor 141 may generate the passing path P1 that passes through a center between the left end of the front object 2 and the left lane marker LM. In another example, the processor 141 may generate the passing path P1 such that a distance between the left end of the front object 2 and the path is greater than a distance between the left lane marker LM and the path. Further, the processor 141 may generate an extension path P2 that extends from the current position of the vehicle 1 to the passing path P1 using a cubic equation.

Thereafter, the driver assistance apparatus 100 may control the vehicle 1 to decelerate to the first speed that is greater than the speed of the front object (1050).

The processor 141 may control the braking device 30 of the vehicle 1 to reduce the traveling speed while the vehicle 1 is traveling along a new path. Specifically, the processor 141 may control the braking device 30 of the vehicle 1 to decelerate to the first speed greater than a speed of the front object 2 in order to overtake the front object 2.

When the vehicle 1 is unable to avoid the front object 2 to the left of the front object 2 (No in 1030), the driver assistance apparatus 100 may identify whether the vehicle 1 is able to avoid the front object 2 to the right of the front object 2 (1040).

The processor 141 may identify whether the vehicle 1 is able to overtake the front object 2 without departing the lane when the front object 2 overlaps the vehicle 1. Specifically, the processor 141 may identify whether the vehicle 1 is able to overtake the front object 2 to the right of the front object 2 without departing the lane.

Identifying whether the vehicle 1 is able to overtake the front object 2 to the right of the front object 2 may be substantially the same as identifying whether the vehicle 1 is able to overtake the front object 2 to the left of the front object 2, except for the difference between left and right.

For example, the processor 141 may identify that the vehicle 1 is avoidable the front object 2 to the right of the front object 2 without departing the lane when a lateral distance d between a right end of the front object 2 and a right marker of the lane is greater than the width W1 of the vehicle 1. In addition, the processor 141 may identify that the vehicle 1 may not avoid the front object 2 to the right of the front object 2 when the lateral distance d is not greater than the width W1 of the vehicle 1.

When the vehicle 1 is able to avoid the front object 2 to the left of the front object 2 (YES in 1030), the driver assistance apparatus 100 may generate a path that passes through the left of the front object 2 (1045).

The processor 141 may generate a passing path P1 that passes through the right of the front object 2 when the lateral distance d is greater than the width W1 of the vehicle 1.

Generating the passing path P1 that passes through the right of the front object 2 may be substantially the same as generating the passing path P1 that passes through the left of the front object 2, except for the difference between left and right.

Thereafter, the driver assistance apparatus 100 may control the vehicle 1 to decelerate to the first speed that is greater than the speed of the front object (1050).

Operation 1050 may be the same as that described above.

The driver assistance apparatus 100 may reduce the speed of the vehicle 1 to the speed of the front object 2 (1060).

The processor 141 may control the braking device 30 of the vehicle 1 to reduce the traveling speed of the vehicle 1 to the speed of the front object 2 to prevent the vehicle 1 from colliding with the front object 2.

As described above, the driver assistance apparatus 100 may allow the vehicle 1 to travel in a manner that avoids the front object 2 to the left or right, depending on a lateral relative position of the front object 2. Further, the driver assistance apparatus 100 may decelerate the vehicle 1 to the traveling speed of the front object 2 when the vehicle 1 is unable to travel by avoiding the front object 2 to the left or right.

Figure 5:
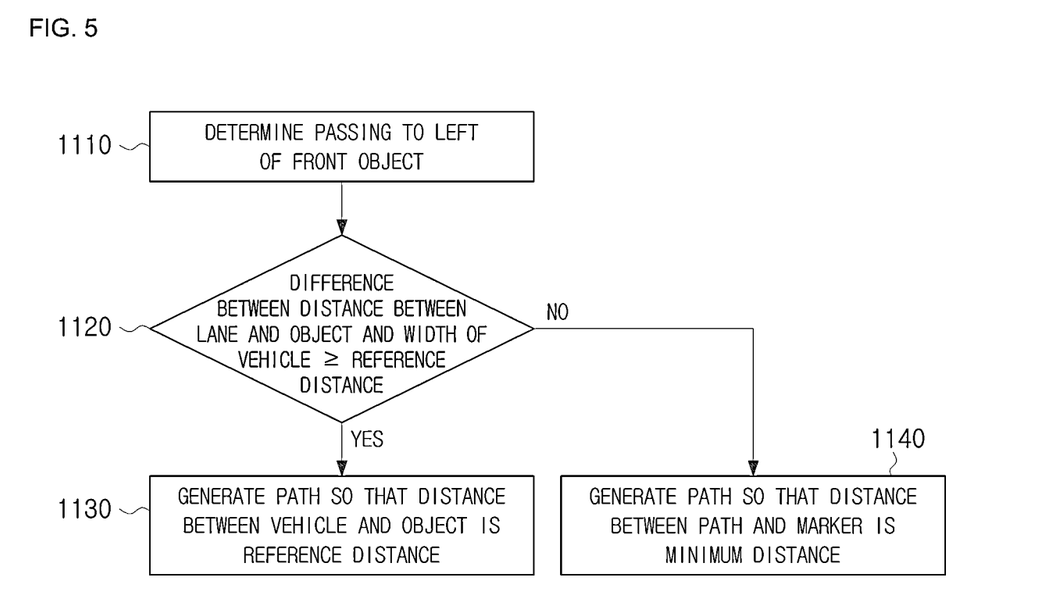
FIG. 5 illustrates a method by which the driver assistance apparatus according to one embodiment controls the vehicle to avoid the front object.
Figure 6:
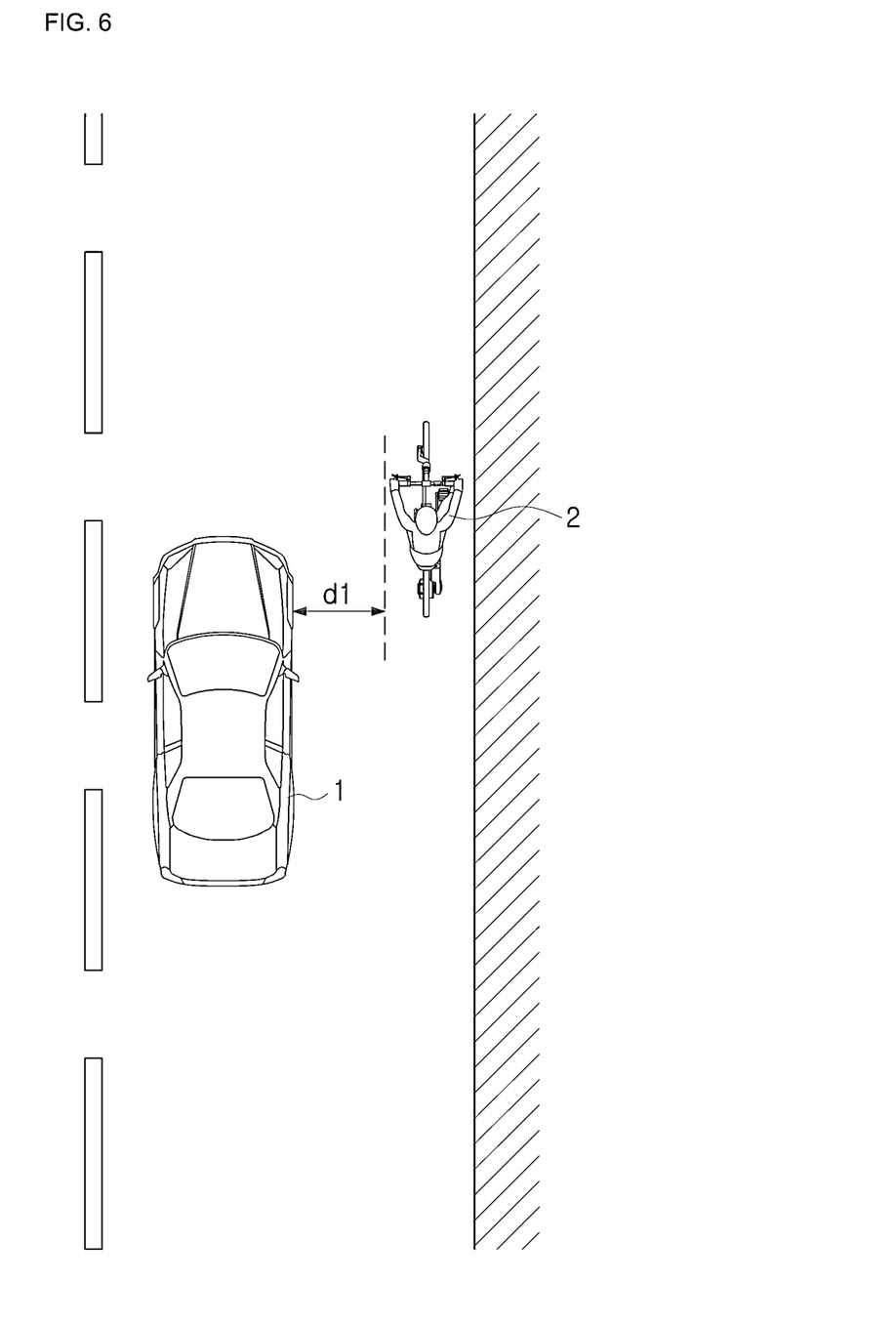
FIG. 6 illustrates an example in which the vehicle avoids the front object in response to the control of the driver assistance apparatus according to one embodiment.
Figure 7:
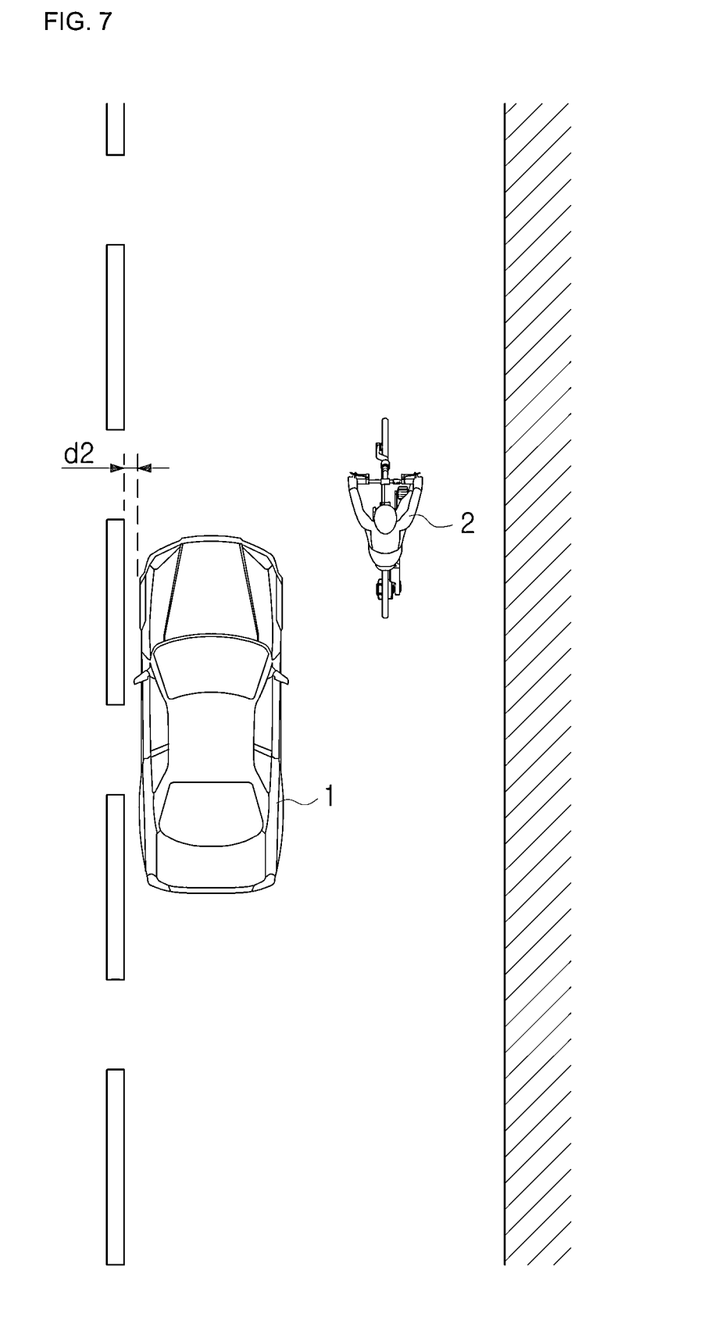
FIG. 7 illustrates another example in which the vehicle avoids the front object in response to a control of the driver assistance apparatus according to one embodiment.

FIG. 5 illustrates a method by which the driver assistance apparatus according to one embodiment controls the vehicle to avoid the front object. FIG. 6 illustrates an example in which the vehicle avoids the front object in response to the control of the driver assistance apparatus according to one embodiment. FIG. 7 illustrates another example in which the vehicle avoids the front object in response to the control of the driver assistance apparatus according to one embodiment.

With reference to FIGS. 5, 6, and 7, the driver assistance apparatus 100 may determine passing to the left of the front object 2 (1110).

The processor 141 may identify that the vehicle 1 may avoid the front object 2 to the left of the front object 2 without departing the lane when the lateral distance d is greater than the width W1 of the vehicle 1. In addition, the processor 141 may identify that the vehicle 1 may avoid the front object 2 to the right of the front object 2 without departing the lane when the lateral distance d is greater than the width W1 of the vehicle 1.

Hereinafter, it is described that the vehicle 1 passes to the left of the front object 2, but the following description may also be applied to the vehicle 1 passing to the right of the front object 2.

The driver assistance apparatus 100 may identify whether the lateral distance d between the left lane marker LM and the front object 2 is greater than or equal to the sum of the width W1 of the vehicle 1 and a reference distance (1120).

The processor 141 may identify the lateral distance d between the left end of the front object and the left lane marker LM based on the lateral distance LD2 between the center of the vehicle 1 and the lane marker LM, the lateral distance LD1 between the center of the vehicle 1 and the front object 2, and the width W2 of the front object 2.

The processor 141 may compare the lateral distance d with the sum of the width W1 of the vehicle 1 and the reference distance. Thereby, the processor 141 may identify whether there is a sufficient space for the vehicle 1 to pass on the left of the front object 2.

When the lateral distance d is greater than or equal to the sum of the width W1 of the vehicle 1 and the reference distance (YES in 1120), the driver assistance apparatus 100 may generate a path such that a distance between the vehicle 1 and the front object 2 is the reference distance (1130).

The processor 141 may identify that there is a sufficient space for the vehicle 1 to pass on the left side of the front object 2 when a difference between the lateral distance d and the width W1 of the vehicle 1 is greater than or equal to the reference distance.

Therefore, the processor 141 may generate a traveling path of the vehicle 1 to overtake the front object 2 to the left of the front object 2 while maintaining the reference distance d1 from the front object 2 to avoid colliding with the front object 2, as illustrated in FIG. 6. Further, the processor 141 may control the driving device 20 and/or the steering device 40 of the vehicle 1 to allow the vehicle 1 to travel along the generated traveling path.

Accordingly, the driver assistance apparatus 100 may generate a path based on the position of the front object 2 when there is a sufficient space in which the vehicle 1 may avoid the front object 2 without departing the lane. The driver assistance apparatus 100 may generate a path spaced apart from the front object 2 by the reference distance.

When the lateral distance d is less than the sum of the width W1 of the vehicle 1 and the reference distance (No in 1120), the driver assistance apparatus 100 may generate a path such that the distance between the vehicle 1 and the lane marker LM is a minimum distance (1140).

The processor 141 may identify that the vehicle 1 may avoid the front object 2 to the left of the front object 2, but that there is no sufficient space on the left side of the front object 2 for the vehicle 1 to pass, when the lateral distance d is less than the sum of the width W1 of the vehicle 1 and the reference distance.

Therefore, the processor 141 may generate a traveling path for the vehicle 1 such that the vehicle 1 passes to the left of the front object 2 while maintaining a minimum distance d2 from the lane marker LM, as illustrated in FIG. 7, to prevent the vehicle 1 from departing the lane. Further, the processor 141 may control the driving device 20 and/or the steering device 40 of the vehicle 1 to allow the vehicle 1 to travel along the generated traveling path.

As described above, the driver assistance apparatus 100 may generate a path based on the position of the lane marker LM when the vehicle 1 is able to avoid the front object 2, but there is no sufficient space to avoid the front object 2. The driver assistance apparatus 100 may generate a path that does not deviate from the lane.

According to one aspect of the present disclosure, a driver assistance system may be provided that is capable of avoiding a collision with a two-wheeled transportation, a vehicle, a pedestrian, or the like, without interfering with traffic flow.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for driver assistance, the apparatus comprising:
   a sensor comprising at least one selected from a group consisting of a camera and a radar, the camera installed on a vehicle, having a field of view outside the vehicle, and configured to provide image data, and the radar installed on the vehicle, having a detection area outside the vehicle, and configured to provide radar data; and
   at least one processor configured to control the vehicle based on processing at least one of the image data or the radar data,
   wherein the at least one processor is configured to:
   avoid a front object of the vehicle based on processing the at least one data;
   compare a distance between the front object and a lane line marker with a first reference distance;
   provide an avoidance path based on a position of the front object in response to the distance being greater than or equal to the first reference distance;
   provide an avoidance path based on a position of the lane line marker in response to the distance being less than the first reference distance; and
   control the vehicle to travel along the avoidance path.

2. The apparatus of claim 1, wherein the at least one processor is configured to provide an avoidance path maintaining a distance between the vehicle and the front object as a second reference distance in response to the distance between the front object and the lane line marker being greater than or equal to the first reference distance.

3. The apparatus of claim 2, wherein the second reference distance is based on a difference between the first reference distance and a width of the vehicle.

4. The apparatus of claim 1, wherein the at least one processor is configured to provide an avoidance path maintaining a distance between the vehicle and the lane line marker as a third reference distance in response to the distance between the front object and the lane line marker being less than the first reference distance.

5. The apparatus of claim 4, wherein the third reference distance is less than a difference between the first reference distance and a width of the vehicle.

6. The apparatus of claim 1, wherein the at least one processor is configured to avoid the front object of the vehicle based on whether the front object overlaps the vehicle.

7. The apparatus of claim 1, wherein the at least one processor is configured to avoid the front object of the vehicle based on whether the distance between the front object and the lane line marker is greater than or equal to a width of the vehicle.

8. The apparatus of claim 7, wherein the at least one processor is configured to reduce a speed of the vehicle to a speed of the front object based on the distance between the front object and the lane line marker being less than the width of the vehicle.

9. A method for driver assistance, the method comprising:
   processing at least one of image data provided from a camera having a field of view outside a vehicle or radar data provided from a radar having a detection area outside the vehicle;
   avoiding a front object of the vehicle based on processing the at least one data,
   wherein the avoiding of the front object of the vehicle comprises:
   comparing a distance between the front object and a lane line marker with a first reference distance;
   providing an avoidance path based on a position of the front object in response to the distance being greater than or equal to the first reference distance;
   providing an avoidance path based on a position of the lane line marker in response to the distance being less than the first reference distance; and
   controlling the vehicle to travel along the avoidance path.

10. The method of claim 9, wherein the avoiding of the front object of the vehicle further comprises providing an avoidance path maintaining a distance between the vehicle and the front object as a second reference distance in response to the distance between the front object and the lane line marker being greater than or equal to the first reference distance.

11. The method of claim 10, wherein the second reference distance is based on a difference between the first reference distance and a width of the vehicle.

12. The method of claim 9, wherein the avoiding of the front object of the vehicle further comprises providing an avoidance path maintaining a distance between the vehicle and the lane line marker as a third reference distance in response to the distance between the front object and the lane line marker being less than the first reference distance.

13. The method of claim 12, wherein the third reference distance is less than a difference between the first reference distance and a width of the vehicle.

14. The method of claim 9, wherein the avoiding of the front object of the vehicle comprises avoiding the front object of the vehicle based on whether the front object overlaps the vehicle.

15. The method of claim 9, wherein the avoiding of the front object of the vehicle comprises avoiding the front object of the vehicle based on whether the distance between the front object and the lane line marker is greater than or equal to a width of the vehicle.

16. The method of claim 15, wherein the avoiding of the front object of the vehicle comprises reducing a speed of the vehicle to a speed of the front object upon the distance between the front object and the lane line marker being less than a width of the vehicle.

17. An apparatus for driver assistance, the apparatus comprising:
   a camera installed on a vehicle, having a field of view outside the vehicle, and configured to provide image data;
   a radar installed on the vehicle, having a detection area outside the vehicle, and configured to provide radar data;
   a first processor configured to provide first information on an object around the vehicle based on processing the image data;
   a second processor configured to provide second information of the object around the vehicle based on processing the radar data; and
   a third processor configured to avoid a front object of the vehicle based on at least one of the first information or the second information,
   wherein at least one processor of the first processor, the second processor or the third processor is configured to:
   compare a distance between the front object and a lane line marker with a first reference distance;

provide an avoidance path based on a position of the front object in response to the distance between being greater than or equal to the first reference distance; and provide an avoidance path based on a position of the lane line marker in response to the distance being less than the first reference distance; and wherein the third processor is configured to control the vehicle to travel along the avoidance path.

18. The apparatus of claim 17, wherein the at least one processor is configured to provide an avoidance path maintaining a distance between the vehicle and the front object as a second reference distance based on a difference between the first reference distance and a width of the vehicle in response to the distance between the front object and the lane line marker being greater than or equal to the first reference distance.

19. The apparatus of claim 17, wherein the at least one processor is configured to provide an avoidance path maintaining a distance between the vehicle and the lane line marker as a third reference distance being less than a difference between the first reference distance and a width of the vehicle in response to the distance between the front object and the lane line marker being less than the first reference distance.

20. The apparatus of claim 17, wherein the third processor is configured to reduce a speed of the vehicle to a speed of the front object based on the distance between the front object and the lane line marker being less than a width of the vehicle.

* * * * *